United States Patent
Dillard et al.

(10) Patent No.: US 9,418,472 B2
(45) Date of Patent: Aug. 16, 2016

(54) BLENDING BETWEEN STREET VIEW AND EARTH VIEW

(71) Applicant: Google Inc., Mountain View, CA (US)

(72) Inventors: Scott Edward Dillard, Shoreline, WA (US); Evan Hardesty Parker, Los Altos, CA (US); Michael Cameron Jones, Seattle, WA (US)

(73) Assignee: Google Inc., Mountain View, CA (US)

( * ) Notice: Subject to any disclaimer, the term of this patent is extended or adjusted under 35 U.S.C. 154(b) by 55 days.

(21) Appl. No.: 14/333,678

(22) Filed: Jul. 17, 2014

(65) Prior Publication Data

US 2016/0019713 A1    Jan. 21, 2016

(51) Int. Cl.
*G06T 15/50* (2011.01)
*G06T 7/40* (2006.01)
*G06T 17/05* (2011.01)

(52) U.S. Cl.
CPC ............... *G06T 15/503* (2013.01); *G06T 7/408* (2013.01); *G06T 17/05* (2013.01)

(58) Field of Classification Search
None
See application file for complete search history.

(56) References Cited

U.S. PATENT DOCUMENTS

| | | | |
|---|---|---|---|
| 6,199,014 B1 | 3/2001 | Walker et al. |
| 6,351,710 B1 | 2/2002 | Mays |
| 6,437,797 B1 | 8/2002 | Ota |
| 7,096,428 B2 | 8/2006 | Foote et al. |
| 7,746,376 B2 | 6/2010 | Mendoza et al. |
| 7,810,037 B1 | 10/2010 | Edwards et al. |
| 7,873,468 B2 | 1/2011 | Matsuura et al. |
| 8,015,172 B1 | 9/2011 | Cave et al. |
| 8,073,461 B2 | 12/2011 | Altman et al. |
| 8,131,118 B1 | 3/2012 | Jing et al. |
| 8,493,408 B2 | 7/2013 | Williamson et al. |
| 2001/0010546 A1 | 8/2001 | Chen |

(Continued)

FOREIGN PATENT DOCUMENTS

| | | |
|---|---|---|
| EP | 1404105 A2 | 3/2004 |
| JP | H10126731 A | 5/1998 |

OTHER PUBLICATIONS

Sequeira V. et al. "3D reality modelling: photo-realistic 3D models of real world scenes," 3D Data Processing Visualization and Transmission, 2002. Proceedings. First International Symposium on Jun. 19-21, 2002, Piscataway, NJ, USA, IEEE, Jun. 19, 2002, pp. 116-783, XP010596749.

(Continued)

*Primary Examiner* — Said Broome
(74) *Attorney, Agent, or Firm* — Lerner, David, Littenberg, Krumholz & Mentlik, LLP (57) ABSTRACT

In one aspect, computing device(s) may determine a plurality of fragments for a three-dimensional (3D) model of a geographical location. Each fragment of the plurality of fragments may correspond to a pixel of a blended image and each fragment has a fragment color from the 3D model. The one or more computing devices may determine geospatial location data for each fragment based at least in part on latitude information, longitude information, and altitude information associated with the 3D model. For each fragment of the plurality of fragments, the one or more computing devices may identify a pixel color and an image based at least in part on the geospatial location data, determine a blending ratio based on at least one of a position and an orientation of a virtual camera, and generate the blended image based on at least the blending ratio, the pixel color, and the fragment color.

18 Claims, 8 Drawing Sheets

(56) References Cited

U.S. PATENT DOCUMENTS

| | | | |
|---|---|---|---|
| 2001/0017668 A1 | 8/2001 | Wilcock et al. | |
| 2002/0122073 A1 | 9/2002 | Abrams et al. | |
| 2002/0128766 A1 | 9/2002 | Petzold et al. | |
| 2004/0064338 A1 | 4/2004 | Shiota et al. | |
| 2006/0253781 A1 | 11/2006 | Pea et al. | |
| 2006/0271691 A1 | 11/2006 | Jacobs et al. | |
| 2007/0198182 A1 | 8/2007 | Singh | |
| 2007/0273758 A1 | 11/2007 | Mendoza et al. | |
| 2008/0033641 A1 | 2/2008 | Medalia | |
| 2008/0118184 A1 | 5/2008 | Panabaker et al. | |
| 2008/0215964 A1 | 9/2008 | Abrams et al. | |
| 2009/0055087 A1 | 2/2009 | Beacher | |
| 2009/0135178 A1 | 5/2009 | Aihara et al. | |
| 2009/0210277 A1* | 8/2009 | Hardin | G06Q 10/00 705/7.23 |
| 2009/0307222 A1 | 12/2009 | Matraszek et al. | |
| 2010/0082194 A1 | 4/2010 | Yabushita et al. | |
| 2010/0146397 A1 | 6/2010 | Koch et al. | |
| 2010/0259641 A1 | 10/2010 | Fujimoto | |
| 2010/0325589 A1 | 12/2010 | Ofek et al. | |
| 2011/0118974 A1 | 5/2011 | Chang et al. | |
| 2011/0131597 A1 | 6/2011 | Cera et al. | |
| 2011/0196897 A1 | 8/2011 | Koch et al. | |
| 2011/0211040 A1 | 9/2011 | Lindemann et al. | |
| 2011/0212717 A1 | 9/2011 | Rhoads et al. | |
| 2011/0231745 A1 | 9/2011 | Levesque et al. | |
| 2011/0280497 A1 | 11/2011 | Berger et al. | |
| 2011/0283210 A1 | 11/2011 | Berger et al. | |
| 2012/0033032 A1 | 2/2012 | Kankainen | |
| 2012/0039546 A1 | 2/2012 | Berger et al. | |
| 2012/0059720 A1 | 3/2012 | Musabji et al. | |
| 2012/0066573 A1 | 3/2012 | Berger et al. | |
| 2012/0082401 A1 | 4/2012 | Berger et al. | |
| 2012/0092266 A1 | 4/2012 | Akella | |
| 2012/0141023 A1 | 6/2012 | Wang et al. | |
| 2012/0200665 A1 | 8/2012 | Furumura et al. | |
| 2012/0246562 A1 | 9/2012 | Maness et al. | |
| 2012/0324373 A1 | 12/2012 | Halliday et al. | |
| 2013/0018574 A1 | 1/2013 | Adler | |
| 2013/0090850 A1 | 4/2013 | Mays | |
| 2013/0103303 A1 | 4/2013 | Lynch | |
| 2013/0151597 A1 | 6/2013 | Akiya et al. | |
| 2013/0191359 A1 | 7/2013 | Meadow et al. | |
| 2013/0325319 A1 | 12/2013 | Moore et al. | |
| 2013/0332856 A1 | 12/2013 | Sanders et al. | |
| 2014/0330814 A1 | 11/2014 | Li | |
| 2015/0178561 A1 | 6/2015 | Hensel et al. | |

OTHER PUBLICATIONS

Neumann U. et al "Augmented virtual environments (AVE): dynamic fusion of imagery and 3D models," IEEE Virtual Reality 2003. Proceedings, Los Angeles, California; IEEE Computer Society, Los Alamitos, Mar. 22, 2003, pp. 61-67, XP010637612.

Chi Peng et al. "Integrated Google Maps and smooth street view videos for route planning," Computer Symposium (ICS), 2010 International, IEEE, Piscataway, NJ, USA, Dec. 16, 2010, pp. 319-324, XP031847757.

Chen S. E. et al. "View interpolation for image synthesis," Proceedings of the 20th Annual Conference on Computer Graphics and Interface Techniques, 1993, pp. 279-288, XP002269080.

Chen S. E. "QuickTime VR-an image-based approach to virtual environment navigation," Proceedings of the 22nd Annual Conference on Computer Graphics and Interactive Techniques, 1995, 28-38, XP002269081.

J. Y. Zheng, M. Shi. "Mapping cityscapes, into cyberspace for visualization." Computer Animation and Virtual Worlds, vol. 16, 2005, pp. 97-107, XP002746538.

"Microsoft Photosynth: Home," photosynth.net, copyright Microsoft 2008, accessed at accessed on Mar. 22, 2013, 1 page.

3D Photo Walls: Amazing new way to scan hundreds of images in seconds, copyright VenueView Inc. 2010, accessed at http://venueview.com/3d-photo-wall/, accessed on Sep. 28, 2015, 5 pages.

Debevec, Paul E., "View-Dependent Texture Mapping," in Modeling and Rendering Architecture from Photographs, Chapter 6, pp. 81-95, thesis submitted to Computer Science faculty of U.c. Berkeley, United States (Fall 1996).

Fischler, M.A., and Bolles, rCc., "Random Sample Consensus. A Paradigm for Model Fitting with Applications to Image Analysis and Automated Cartography," Jun. 1981, vol. 24, No. 6, pp. 381-395.

O'Connor, Tim, "Make a 3D Photo Tour with Live Search Maps," published Apr. 15, 2008, Windows Live Photo & Video Blog: Official blog for the Windows Live Digital Memories Experience team, blogs.MSDN.com, accessed at http://blogs.msdn.com/b/pix/archive/2008/04/15/make-a-3 d-photo-tour-with-live-.

Snavely, et al., "Photo Tourism: Exploring Photo Collections in 3D" ACM Transactions on Graphics 25(3), Association for Computing Machinery, Inc.; United.

Szeliski, R., "Image Alignment and Stitching: A Tutorial," Foundations and Trends® in Computer, Computer Graphics and Vision, vol. 2, No. 1, 2006, pp. 1-104.

"Building a Tour (Pano2VR)" [online], retrieved May 5, 2014, <http://ggnome.com/wiki/building_a_Tour_(Pano2VR)>, 14 pages.

"Easypano The Virtual Tour Way" [online], Copyright 2001-2014, <http://www.easypano.com/video-tutorial/>, 1 page.

"Google Business Photos Trusted Agency Training", [online], retrieved Oct. 12, 2013, <http://sites.google.com/google.com/trusted-agency-training/en/pano-editor>, 23 pages.

"Google Earth Outreach Storytelling with maps using Tour Builder", [online], retrieved May 5, 2014, <https://www.google.com/earth/outreach/tutorials/tourbuilder.html>, 38 pages.

"Google Earth Showcase", [online], retrieved May 5, 2014, <https://www.google.com/earth/explore/showcase/>, 5 pages.

"Imagery and Street View Overview" [online], Copyright 2014, <http://support.google.com/maps/answer/3093457?hl=en&rd=1>, 2 pages.

"Kolor Panotour Pro", [online], retrieved Nov. 13, 2013, <http://www.kolor.com/panotour-pro-profesionnal-360-virtual-tour-software-home.html>, 1 page.

"Panotour Pro Documentation", [online], retrieved Nov. 13, 2013, <http://www.autopano.net/wiki-en/action/view/Panotour_Pro_Documentation>, 2 pages.

"Take 100,000 more tours inside Google Earth", Jan. 30, 2013, <https://www.cnet.com/news/take-100000-more-tours-inside-google-earth/>, 3 pages.

"Tour Builder", [online], Copyright 2013, <https://tourbuilder.withgoogle.com/about/faq>, 1 page.

"Using Tours" [online], Copyright 2014, <https://support.google.com/earth/answer/148174?hl=en>, 4 pages.

Boult, et al., "Omnidirectional Video Applications", VAST Lab, copyright 2000.

Bradley, D. et al. (Oct. 1-2, 2005). Image-Based Navigation in Real Environments Using Panoramas. IEEE International Workshop on Haptic Audio Environments and their Applications (HAVE'2005)—HAVE Manuscript 20. National Research Council of Canada, 5 pages.

Chen, B. et al. (2009). Integrated Videos and Maps for Driving Directions. User Interface Science and Technology (Proceedings of UIST 2009), 9 pages. Retrieved from <http://research.microsoft.com/en-us/um/people/cohen/vdd_webpage/>.

Foote, et al., "FlyCam: Practical Panoramic Video and Automatic Camera Control", FX Palo Alto Laboratory, Inc., copyright 2000, pp. 1419-1422.

Google Street View and Driving Directions. Google Driving View. (© 2011). RedTree Software. This web application can be accessed at: <http://www.redtreesoft.com/Google/GoogleDrivingView.htm>.

Google Street View Hyperlapse (© 2013) Teehan+Lax Labs. This web application can be accessed at: <http://hyperlapse.tllabs.io>.

Jeremy Pack, Finding the Best Panoramas, Fall 2011, 5 pages.

Kang, et al., "Virtual Navigation of Complex Scenes using Clusters of Cylindrical Panoramic Images", copyright 1998.

Zhao, Q. et al. (Dec. 2013). Cube2Video. Navigate Between Cubic Panoramas in Real-Time. IEEE Transactions on Multimedia, vol. 15, No. 8, pp. 1745-1754.

* cited by examiner

BLENDING BETWEEN STREET VIEW AND EARTH VIEW

BACKGROUND

Map applications may display street-level and aerial images of various geographic regions for users to view. In addition to viewing these images, users may be able to toggle between a street-level image and an aerial image (or vice versa), or view a series of connected or disconnected street-level images. However, map applications make it difficult for users to maintain a sense of spatial context and direction when viewing the street-level images. For instance, when consecutively displaying two or more street-level images separated by relatively large distances, it may disorient users from spatial awareness of the geographic region.

BRIEF SUMMARY

In one aspect, a method for generating a blended image comprises determining, by one or more computing devices, a plurality of fragments for a three-dimensional (3D) model of a geographical location, wherein each fragment of the plurality of fragments corresponds to a pixel of the blended image and each fragment has a fragment color from the 3D model. Further, the method comprises determining, by the one or more computing devices, geospatial location data for each fragment based at least in part on latitude information, longitude information, and altitude information associated with the 3D model, and for each fragment of the plurality of fragments, identifying, by the one or more computing devices, a pixel color and an image based at least in part on the geospatial location data. Moreover, the method comprises determining, by the one or more computing devices, a blending ratio based on at least one of a position and an orientation of a virtual camera, and generating, by the one or more computing devices, the blended image based on at least the blending ratio, the pixel color, and the fragment color.

In another aspect, a system comprises a memory and one or more computing devices, each of the one or more computing devices having one or more processors, the one or more computing devices being coupled to the memory. The one or more computing devices are configured to determine a plurality of fragments for a three-dimensional (3D) model of a geographical location. Each fragment of the plurality of fragments corresponds to a pixel of a blended image and each fragment has a fragment color from the 3D model. Further, the one or more computing devices are configured to determine geospatial location data for each fragment based at least in part on latitude information, longitude information, and altitude information associated with the 3D model. For each fragment of the plurality of fragments, the one or more computing devices are configured to identify a pixel color and an image based at least in part on the geospatial location data, determine a blending ratio based on at least one of a position and an orientation of a virtual camera, and generate the blended image based on at least the blending ratio, the pixel color, and the fragment color.

In yet another aspect, a non-transitory, tangible computer-readable medium on which instructions are stored, the instructions, when executed by one or more computing devices perform a method for generating a blended image, the method comprises determining a plurality of fragments for a three-dimensional (3D) model of a geographical location, wherein each fragment of the plurality of fragments corresponds to a pixel of the blended image and each fragment has a fragment color from the 3D model. Further, the method comprises determining geospatial location data for each fragment based at least in part on latitude information, longitude information, and altitude information associated with the 3D model, and for each fragment of the plurality of fragments, identifying a pixel color and an image based at least in part on the geospatial location data. Moreover, the method comprises determining a blending ratio based on at least one of a position and an orientation of a virtual camera, and generating the blended image based on at least the blending ratio, the pixel color, and the fragment color.

DETAILED DESCRIPTION

Overview

The present disclosure is directed to transitions between street-level images and 3D models of the same area. A transition may include changing from street-level imagery in one location to a 3D model view, and to street-level imagery in a second location. For example, a user may want to view on a client computing device a series of street-level images on a client computing device (e.g., smartphone, tablet, computer), each of which may be separated by various distances. In order to maintain a sense of spatial context and direction, the client computing device may transition the display of one street-level image to another street-level image via an intermediate aerial view of the 3D model that provides spatial context to both images. In this regard, the user has the feeling that a virtual camera is moving up and away from one street level image into an aerial view and then subsequently moving down and into a second street level image as if the user has "jumped" between the images.

As one example, street-level images and 3D models may be provided to a client by one or more server computing devices. A street-level image may be an image of geographic objects, people and/or objects that were captured by a camera at an angle generally perpendicular to the ground. A 3D model may include may include information such as textures, shapes, colors, etc. of features within the model. The client computing device may prefetch the 3D model and associated information from the one or more server computing devices.

In order to create a transition between two street level images, each street-level image may be blended with the 3D model for a series of positions of a virtual camera to form a blended image. When strung together, the different blended images may be displayed or provided for display on the client computing device as an animation of the transition between two street level images.

For a given position of the virtual camera, in order to blend a street-level image with a 3D model of the depicted area, the 3D model may be rasterized into individual fragments. Each fragment may have a fragment color derived from the 3D model. Moreover, each fragment may correspond to a pixel on the client computing device's display. Using a programmable graphics processing unit (GPU) of the client computing device, geospatial location data (latitude, longitude, altitude) may be determined for each fragment. In that regard, the geospatial location data may be used to identify a particular color that a street-level image projects onto each fragment form the given position of the virtual camera. Once respective colors are identified, the client computing device may then blend those colors projected from the image with the associated fragment colors from the 3D model. Any reference to "pixel" in the present disclosure refers to the pixels of an image, e.g., a street-level image. Further, any reference to "fragment" in the present disclosure refers to the fragments of a 3D model.

For each given position of the virtual camera, a blending ratio may be determined. Each blending ratio may be based on the virtual camera's position relative to the image within the 3D model. The blending ratio may signify how much color derived from the image there may be compared to a color of the corresponding fragment. For example, if the position of the virtual camera and the street-level image are coincident, the color of the fragment may be entirely derived from the street-level image. As the position of the virtual camera moves away from the image, the blending ratio may be adjusted toward that of the 3D model. In another example, the blending ratio may further depend on distortion of color projection from the image onto the fragment. For instance, if the position of the virtual camera, the fragment, and the image are such that the projections are highly distorted, the blending ratio may be adjusted to increase the color of the associated fragment.

The blending ratios are then used to blend the colors corresponding to the street-level image and the fragments of the 3D model in order to generate a blended image for each given position of the virtual camera. In this regard, each fragment may be assigned a color using the blending ratio in order to generate a blended image. Again each blended image corresponds to a different location of the virtual camera. The final blended images may be displayed on the client computing device in series following the positions of the virtual camera as an animation.

The above-described features provide a user a sense of spatial context when animating from one street-level image to another street-level image by displaying an intermediate aerial view of the area surrounding both images. Moreover, the technology reduces visual distortion of the transition between street-level and aerial views (and vice versa) based on a 3D aerial model as well as geospatial location and geometric data. A further advantage is that the technology may be implemented on a client computing device.

Example Systems

Figure 1:
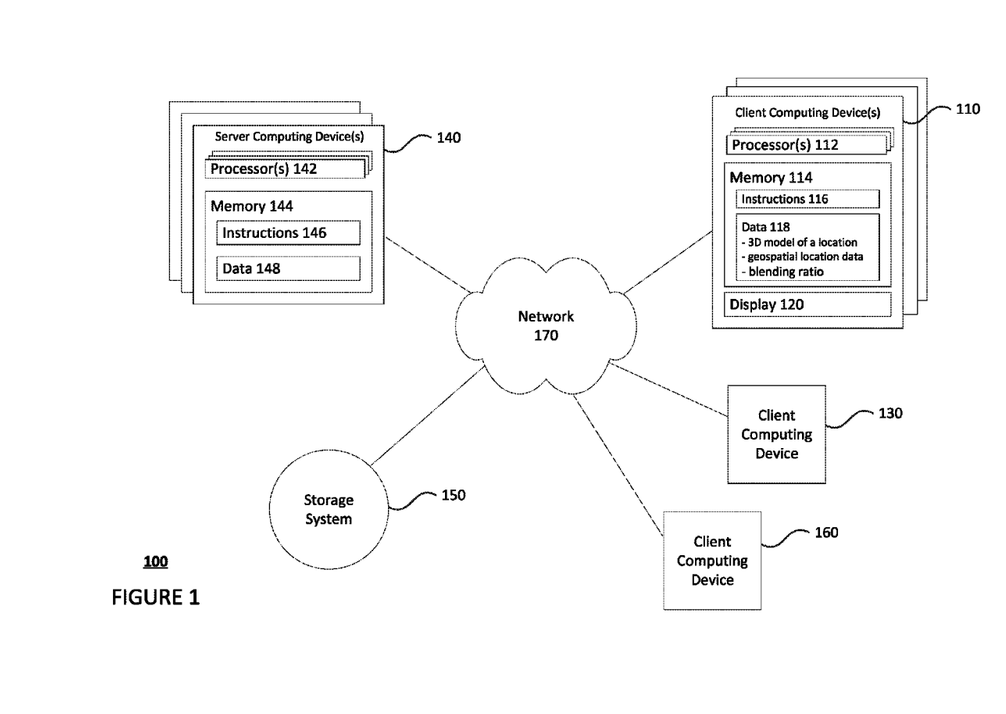
FIG. 1 is a functional diagram of a system in accordance with aspects of the disclosure.
Figure 2:
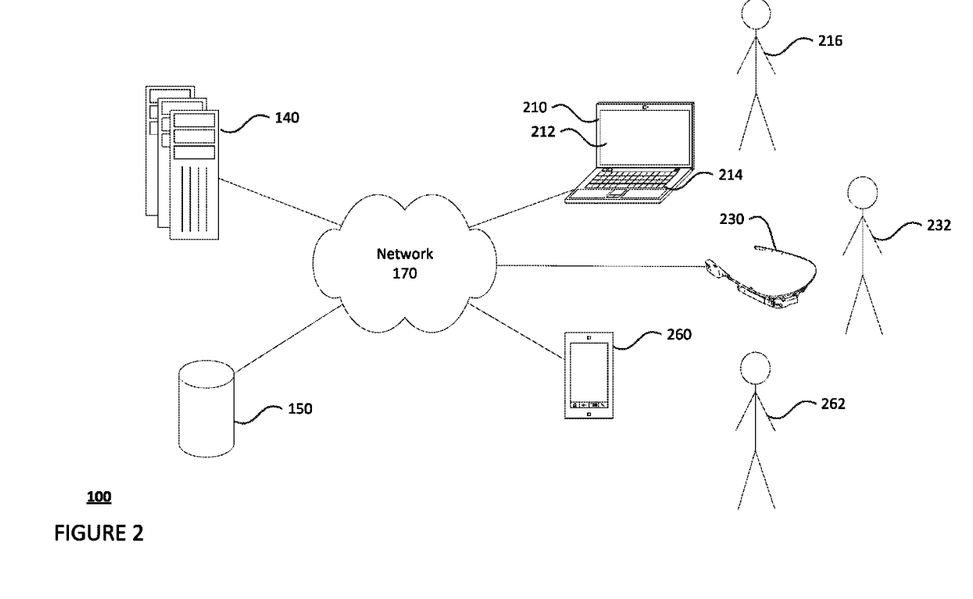
FIG. 2 is a pictorial diagram of an example system in accordance with aspects of the disclosure.

FIGS. 1 and 2 illustrate one possible system 100 in which the aspects disclosed herein may be implemented. In FIG. 1, system 100 includes client computing devices 110, 130 and 160. As shown, the one or more client computing devices 110 may contain one or more processors 112, a memory 114, a display 120 and other components typically present in general purpose computing devices.

Although FIG. 1 functionally represents each of the processor 112 and memory 114 as a single block within the one or more client computing device 110, which is also represented as a single block, the system may include and the methods described herein may involve multiple processors, memories and devices that may or may not be stored within the same physical housing. For instance, various examples and methods described below as involving a single component (e.g., one or more processors 112) may involve a plurality of components (e.g., multiple computing devices distributed over a network of computing devices, computers, "racks," etc. as part of a parallel or distributed implementation; further, the various functions performed by the embodiments may be executed by different computing devices at different times as load is shifted from among computing devices). Similarly, various examples and methods described below as involving different components (e.g., client computing devices 110, 130 and 160) may involve a single component (e.g., rather than client computing device 130 performing a determination described below, client computing device 130 may send the relevant data to the one or more client computing devices 110 for processing and receive the results of the determination for further processing or display).

Memory 114 of the one or more client computing devices 110 may store information accessible by the one or more processors 112, including instructions 116 that may be executed by the processor(s). Memory 114 may also include data 118 that may be retrieved, manipulated or stored by the one or more processors 112. Memory 114 and the other memories described herein may be any type of storage capable of storing information accessible by the relevant processor, such as a hard-disk drive, a solid state drive, a memory card, RAM, ROM, DVD, write-capable memory or read-only memories. In addition, the memory may include a distributed storage system where data, such as data 118, is stored on a plurality of different storage devices which may be physically located at the same or different geographic locations.

The instructions 116 may be any set of instructions to be executed by the one or more processors 112 or other computing devices. In that regard, the terms "instructions," "application," "steps" and "programs" may be used interchangeably herein. The instructions may be stored in object code format for immediate processing by a processor, or in another computing device language including scripts or collections of independent source code modules, that are interpreted on demand or compiled in advance. Functions, methods and routines of the instructions are explained in more detail below. The one or more processors 112 may each be any conventional processor, such as a commercially available central processing unit ("CPU") or a graphics processing unit ("GPU"). Alternatively, the processors may be a dedicated component such as an application-specific integrated circuit ("ASIC"), a field programmable gate array ("FPGA"), or other hardware-based processor.

Data 118 may be retrieved, stored or modified by the one or more client computing devices 110 in accordance with the instructions 116. For instance, although the subject matter described herein is not limited by any particular data structure, the data may be stored in computer registers, in a relational database as a table having many different fields and records, or XML documents. The data may also be formatted in any computing device-readable format such as, but not limited to, binary values, ASCII or Unicode. Moreover, the data may comprise any information sufficient to identify the relevant information, such as numbers, descriptive text, proprietary codes, pointers, references to data stored in other memories such as at other network locations, or information that is used by a function to calculate the relevant data. As discussed in more detail below with regard to FIGS. 3-6, data 118 may comprise, for example, at least turn-by-turn directions, road segments, waypoints, panoramic images associated with various road segments, filtering parameters, etc.

Display 120 and other displays described herein may be any type of display, such as a monitor having a screen, a touch-screen, a projector, or a television. The display 120 of the one or more computing devices 110 may electronically display information to a user via a graphical user interface ("GUI") or other types of user interfaces. For example, as will be discussed below, display 120 may electronically display a web browser including a map interface with turn-by-turn directions between two geographic locations, corresponding road segments, and waypoints.

In addition, the client computing devices 110, 130 and 160 may be at one node of a network 170 and capable of directly and indirectly communicating with other nodes of network 170, such as one or more server computing devices 140 and a storage system 150. Although only a few computing devices are depicted in FIG. 1, a typical system may include a large number of connected computing devices, with each different computing device being at a different node of the network 170. The network 170 and intervening nodes described herein may be interconnected using various protocols and systems, such that the network may be part of the Internet, World Wide Web, specific intranets, wide area networks, or local networks. The network may utilize standard communications protocols, such as Ethernet, Wi-Fi and HTTP, protocols that are proprietary to one or more companies, and various combinations thereof. Although certain advantages are obtained when information is transmitted or received as noted above, other aspects of the subject matter described herein are not limited to any particular manner of transmission of information.

As an example, one or more server computing devices 140 may be a web server that is capable of communicating with the one or more client computing devices 110 via the network 170. As discussed in more detail below with regard to FIG. 2, the client computing devices 110, 130 and 160 may be client computing devices or other user devices, and the one or more server computing devices 140 may provide information for display by using network 170 to transmit and present information to a user of the client computing devices 110, 130 and 160.

As another example, storage system 150 may store various images. For example, the images may be street level panoramic images, photographs, pictures, etc. An example of a street-level image is an image of geographic objects, people and/or objects that were captured by a camera at an angle generally perpendicular to the ground, or where the camera is positioned at or near the ground level. Thus, the street level image may represent various geographic objects, such as buildings, a sidewalk, streets, vehicles, people, street lights, signs, advertisements, trees, sculptures, bodies of water, storefronts, landmarks, etc.

Some of the images stored in storage system 150 may also be associated with information indicating the orientation of the image. For example, if a street-level image is a typical photograph, the orientation may simply be the camera angle. If a street-level image is a 360° panoramic image, such as a 360° panorama centered at the geographic location associated with the image, the orientation may indicate that portion of the image that corresponds with looking due north from the camera position at an angle directly parallel to the ground.

Further, the above-described images may also include metadata, which may include the geographic location of the image (e.g., GPS coordinates), time of day or time of year, orientation of the device (e.g., angle, pitch, roll and/or compass point), accelerometer information, accuracy of the GPS location, GPS location statistics (e.g., urban vs. rural vs. wilderness), etc.

The storage system 150 may also store 3D models of various geographical areas. For example, a 3D model may be a computer-generated mathematical representation of a particular geographical area. The 3D model may be provided for display as a two-dimensional image via 3D rendering or may be used in computer simulation. The 3D model may be also generated manually or automatically via 3D modeling software. Moreover, the 3D model may exhibit various textures, shapes, colors, etc. of the modeled features.

The storage system 150 may further store geospatial location associated with the 3D models and fragments thereof. The geospatial location data may be used to determine which fragments of the 3D model correspond to which pixels of a street-level image. The geospatial location data includes at least latitude, longitude, and altitude information corresponding to the 3D model of a geographical location.

As with memory 114, storage system 150 can be of any type of computerized storage capable of storing information accessible by the one or more server computing devices 140, such as hard-drive, memory card, ROM, RAM, DVD, CD-ROM, write-cable, and read-only memories. Moreover, storage system 150 may include a distributed storage system where data is stored on a plurality of different storage devices that may be physically located at the same or different geographic locations. Storage System 150 may be connected to the client computing devices via the network 170 as shown in FIG. 1 and/or may be directly connected to or incorporated into any of the client computing devices, e.g., 110, 130 and 160 (not shown). In that regard, data 118 stored in memory 114 may be retrieved from storage system 150.

The one or more client computing devices 110 may be a personal computing device 210, such as a laptop, intended for use by a user 216 (shown in FIG. 2). The personal computing device 210 may have all of the components normally used in connection with a personal computing device such as a CPU or GPU, memory storing data and instructions, a display such as display 212 (e.g., a monitor having a screen, a touch-screen, a projector, a television, or other device that is operable to display information), and user input device 214 (e.g., a mouse, keyboard, touch-screen, microphone, etc.). In addition, the personal computing device 210 may also include components (not shown) for determining its position and orientation. For example, these components may include a GPS receiver to determine the device's latitude, longitude and/or altitude as well as an accelerometer, gyroscope or other similar devices.

In another example, client computing device 130 may include a wearable computing device 230, such as a head-mounted computing system intended for use by a user 232, or a computing bracelet, computing ring, computing watch, etc. In a further example, client computing device 160 may include a mobile computing device 260 intended for use by a user 262 and capable of wirelessly exchanging data with a server over a network such as the Internet. By way of example only, mobile computing device 260 may be a mobile phone or a device such as a wireless-enabled PDA, a tablet PC, or a netbook that is capable of obtaining information via the internet.

The client computing devices may be configured to operate with an operating system. In that regard, some of the instructions executed during the operations described herein may be provided by the operating system whereas other instructions may be provided by an application installed on the device. The client computing devices 110, 130 and 160, shown in FIGS. 1 and 2, and other computing devices in accordance with the systems and methods described herein may include other devices capable of processing instructions and transmitting data to and from humans and/or other computers including network computers lacking local storage capability and set top boxes for televisions.

Example Methods

In addition to the operations described above and illustrated in the figures, various operations will now be described. The following operations do not have to be performed in the precise order described below. Rather, various steps can be handled in a different order or simultaneously, and steps may also be added or omitted.

Figure 3:
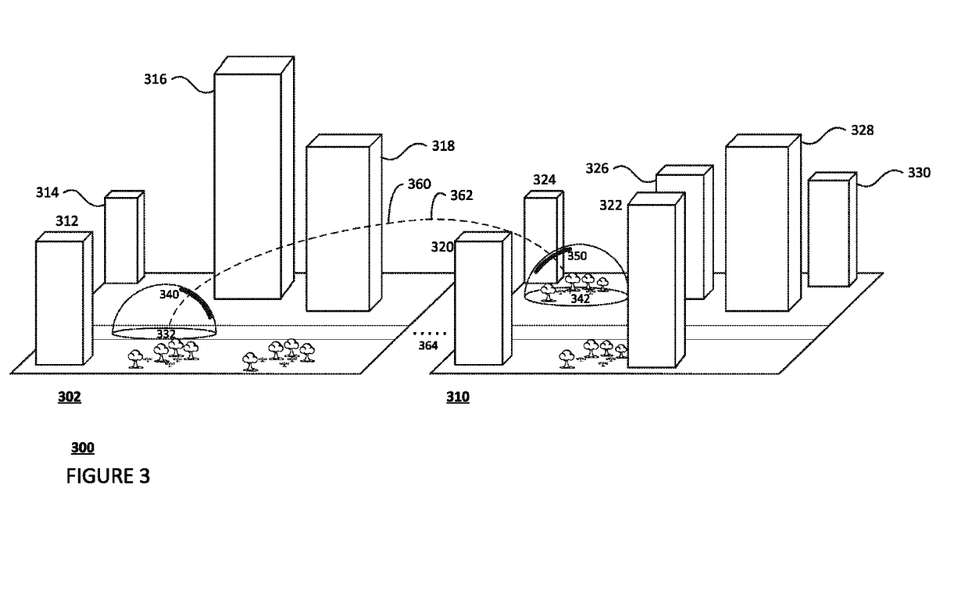
FIG. 3 is an example transition from one image to a second image in a three-dimensional model in accordance with aspects of the disclosure.

FIG. 3 illustrates an example transition from a first street-level image to a second street-level image via a 3D model 300. For example, the 3D model 300 may include at least two different areas 302 and 310. A gap 364 between areas 302 and 310 represents that the two locations may be separated by some distance, e.g., one or more blocks, one or more miles. The gap 364 may be of any size. For instance, the 3D model may encompass the entire planet, e.g., a transition between an image in New York and an image in Japan. As shown, area 302 may include buildings 312, 314, 316 and 318. Further, area 310 may include buildings 320, 322, 324, 326, 328 and 330. The areas 302 and 310 may also include numerous parks and picnic areas, as illustrated.

Locations within the 3D model 300 may be associated with a plurality of images, such as street-level images. These images may be available for display when requested by a user via a client computing device, such as personal computing device 210, wearable computing device 230, or mobile computing device 260. For example, a user may request to view one or more images from a position 332 within area 302. The images associated with the position 332 may be a plurality of street-level images, e.g., panoramic images, stitched together in a generally dome-shaped or spherically-shaped configuration. In that regard, the user may be able to seamlessly view all the street-level images from position 332 by rotating 360 degrees. Similarly, a plurality of street-level images may also be stitched together in a generally dome-shaped configuration to provide the user a 360 degree view at position 342.

In one instance, a user may request to transition from one street-level image to another street-level image that is some distance away. By way of example only, a street-level image 340 may be provided for display on a client computing device. From a position 332, the street-level image 340 may capture some portions of building 316 and all of building 318. Subsequently, the user may request to transition from the street-level image 340 to another street-level image. The next street-level image may be within the same area, or may be in a different. For instance, a transition from street-level image 340 to a street-level image 350 at position 342 in area 310 may be generated.

In order to display a transition from one street-level image to a second street-level image, one or more computing devices may render an intermediate aerial view of a 3D model to give a user viewing the transition a feeling that the user has "jumped" between the images. The 3D model may be provided for display as a two-dimensional image via 3D rendering. As an example, the 3D model 300 may be used to provide an aerial view during a path of transition 360 between street-level image 340 at position 332 and street-level image 350 at position 342. During the transition 360, a virtual camera may motion about positions along the path, ascend from its initial placement at position 332 up to an apex 362 of a path of transition 360 in the 3D model 300 and descend to position 342 in street-level image 350. For instance, a display screen of a client computing device may be analogous to a film of the camera. In other words, the virtual camera may define the mathematical transformation that converts 3D data associated with the 3D model into images on the display screen. Thus, from the viewpoint of the virtual camera, the user has the feeling that the virtual camera is moving up and away from street level image 340 into an aerial view of the 3D model and then subsequently moving down and into a street level image 350 as if the user has jumped between the images.

A path of a transition from one street-level image to a second street-level image may vary depending on at least the distance between the images. For example, if the street-level images 340 and 350 are spaced further apart, the path of transition 360 may arch higher relative to the 3D model 300. Thus, the higher arch may give a user better spatial awareness and direction between the two street-level images.

When rendering a transition from one street-level image to another street-level image through an aerial view of the 3D model, a series of blended images corresponding to various points along the path of transition corresponding to locations of the virtual camera may be strung together and provided for display. Thus, for each position, e.g., (x, y, z) and orientation of the virtual camera along the path of transition 362 relative to the 3D model 300, a blended image may be generated. In some instances, only a particular set of positions and orientations of the virtual camera may be used during the transition. In other instances, the blended images may be taken at intervaled points along the path of transition to generate the rendering of the transition. In this regard, hardware resources in the client computing device configured to display the transition may be conserved.

To generate a blended image for a given position and orientation of the virtual camera, the 3D model 300 may be rasterized into fragments that correspond to the pixels of a display of a client computing device. In this regard, the position and orientation of the virtual camera relative to the 3D model may be used to "project" the 3D model 300 onto the pixels of the display. Thus, each fragment is associated with color and geographic location information from the 3D model.

Figure 4:
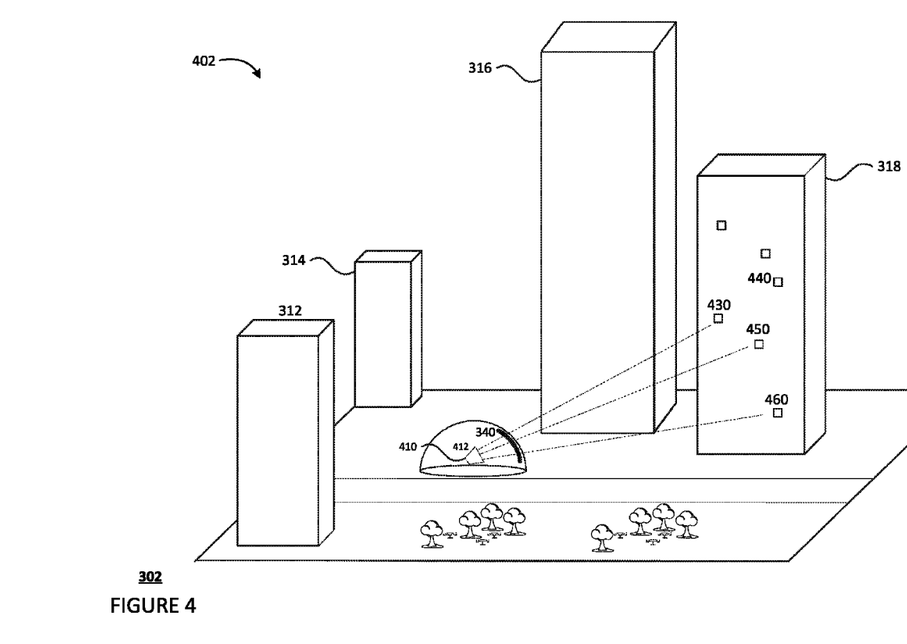
FIG. 4 is an example of a relationship between a virtual camera, an image, and a three-dimensional model in accordance with aspect of the disclosure.

FIG. 4 is an example of a relationship between a virtual camera 410 at position and orientation 412, 3D model 300, and street-level image 340. As shown, the 3D model 402 includes at least fragments 430, 440, 450 and 460 that correspond to pixels of a display of a client computing device given the position and orientation 412 of the virtual camera 410. The location information for each fragment, or pixel, may be determined from the projection. For example, fragments 430, 440, 450, and 460 may be associated with different geographic coordinates having respective latitude, longitude, and altitude information.

Using the location information for each fragment, the position and orientation of virtual camera 410, and/or the geographic location information of a street-level image closest to the position of the virtual camera, one or more computing devices may determine which pixels of the street-level image correspond to the locations of the fragments. This may be used to identify a color of the street-level image corresponding to each fragment. In FIG. 4, the virtual camera 410 may be facing street-level image 340. As such, the virtual camera 410 is oriented in a manner such that the pixels of street-level image 340 project onto fragments 430, 440, 450, and 460 as well as other adjacent fragments. Thus, each fragment may also be associated with a color of the pixels of the street-level image 340.

Figure 5A:
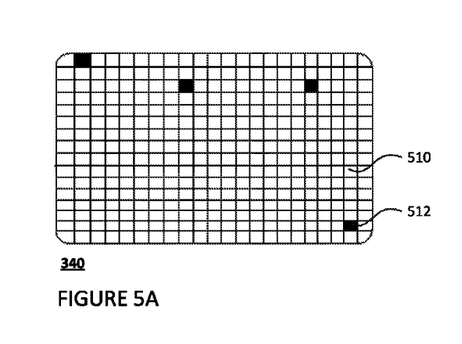
FIG. 5A is an example illustration of pixels associated with an image in accordance with aspects of the disclosure.

FIG. 5A is an example illustration of the pixels associated with a displayable image, such as street-level image 340. As shown, the street-level image 340 may have a particular length and a particular width. For example, the street-level image 340 may be a panoramic image. Moreover, the image 340 may pictorially be represented by a plurality of grid cells 510, where each grid cell represents an individual pixel of the image, such as pixel 512. The pixel 512, as well as the other pixels of image 340, may be associated with certain colors. As noted above, the colors may be associated with the fragments and blended with the corresponding color from the 3D model.

Figure 5B:
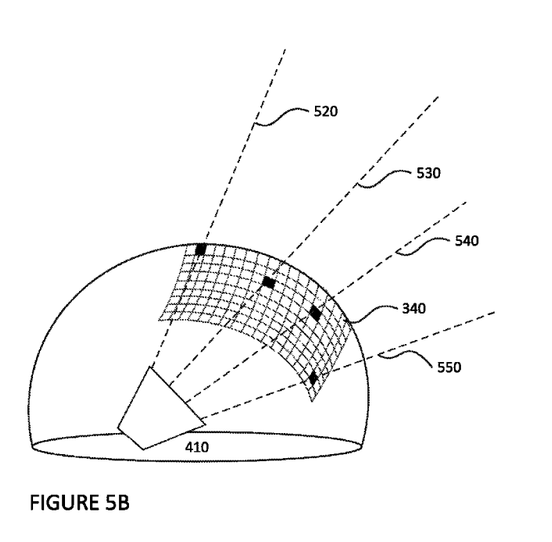
FIG. 5B is an example illustration of pixel projection based on a position and an orientation of a virtual camera in accordance with aspects of the disclosure.

FIG. 5B is an example illustration of pixel projection based on a position and an orientation of virtual camera 410. For example, the street-level image 340 may be one of a plurality of street-level images stitched together in a generally dome-shaped configuration such that a user may be to view all the images by rotating 360 degrees given a particular position and orientation of the virtual camera 410. As shown, the street-level image 340 may be slightly curved. Further, the virtual camera 410 may be positioned to face street-level image 340 and also tilted upward with lines-of-sight 520, 530, 540 and 550 intersecting various pixels of street-level image 340. In one aspect, the lines-of-sight 520 and 550 may represent the boundaries of the virtual camera 410's field of view.

Figure 6:
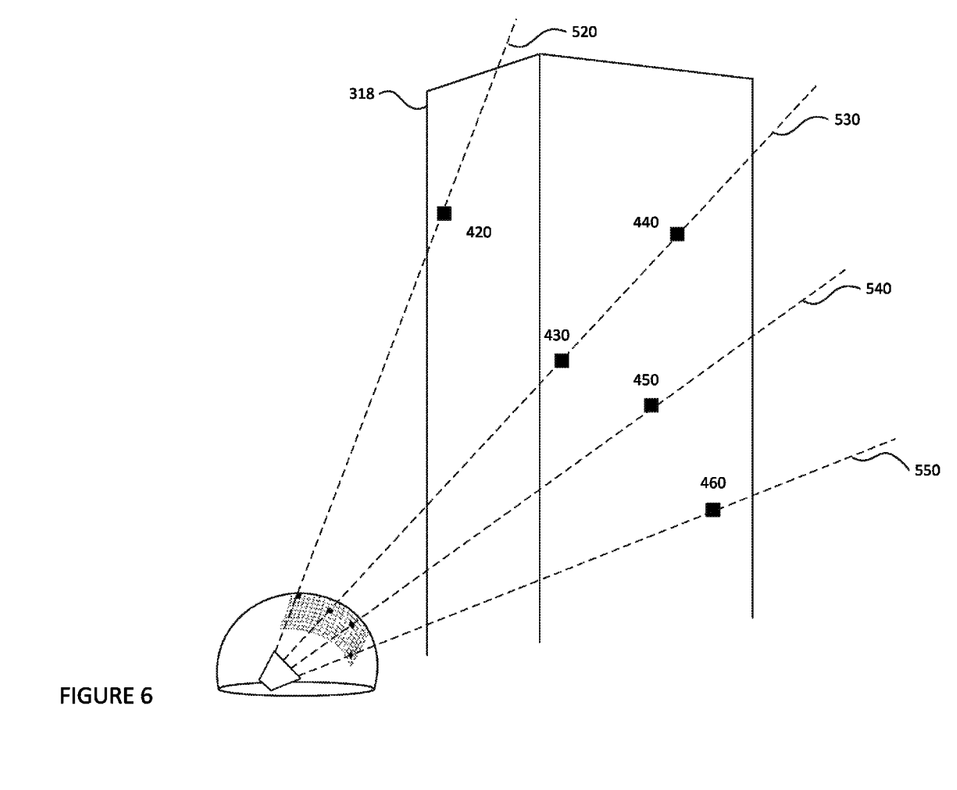
FIG. 6 is an example illustration of pixel projection and blending in accordance with aspects of the disclosure.

FIG. 6 is an example illustration of pixel projection onto fragments from a 3D model. As shown, the pixel projection example of FIG. 5B may be applied to a 3D model of building 318. For example, when the lines-of-sight 520, 530, 540, and 550 from the virtual camera 410 are fully extended, they may align with various fragments of the 3D model of building 318. In one instance, the lines-of-sight 520, 530, 540, and 550 align with at least fragments 420, 430, 440, 450, and 460, respectively. Using the geospatial location data (e.g., latitude, longitude, altitude) of the fragments and alignment information from the position and orientation of the virtual camera 410, the four darkened pixels of street-level image 340 are projected onto the fragments 420, 430, 440, 450, and 460 of the 3D model of building 318.

A blending ratio between the colors associated with the fragments may be determined based on the position and orientation of the virtual camera 410. In this example, a significant amount of color from street-level image may be blended into fragments 430, 440, 450 and 460 due to the virtual camera 410's generally perpendicular alignment with the street-level image 340. Once the colors are blended according to a blending ratio, a final blended image of the 3D model may be provided for display to the user. In this regard, a blended image may be generated for each position of the virtual camera 410 along the path of transition.

The blending of the colors of the pixels and corresponding fragments may be based on a blending ratio. The blending ratio may represent the relationship between the amount of color derived from the street-level image and color derived from the 3D model. The quantitative relationship of the colors may depend on the position, orientation, distance, and line-of-sight of the virtual camera relative to a street-level image.

A line-of-sight from a virtual camera may intersect a pixel at a particular angle. This angle of intersection may at least in part determine the blending ratio at the corresponding fragments. For example, the lines-of-sight 520, 530, 540, and 550 from virtual camera 410 are generally perpendicular to the pixels that are being projected. Due to this generally orthogonal alignment and the close proximity of the virtual camera 410's position and orientation relative to the street-level image, the blending ratio may favor the colors from the street-level image 340. Thus, depending on the virtual camera 410's position, orientation, alignment of line-of-sight, and/or distance from the street-level image 340, the colors of the blending ratio that may be favored will vary.

Figure 7:
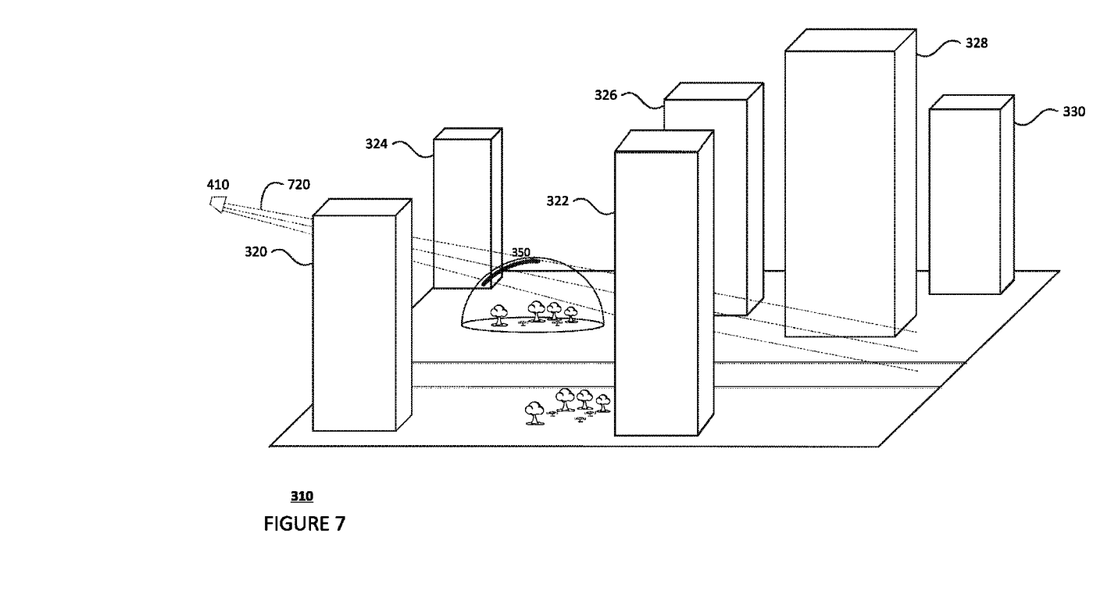
FIG. 7 is an example illustration of pixel projection and blending from another position and orientation of a virtual camera in accordance with aspects of the disclosure.

FIG. 7 is an example illustration of pixel projection and blending from a different position and orientation of the virtual camera 410. This example depicts the latter half of the path of transition 360 depicted in FIG. 3. Similar to area 302, the area 310 includes 3D models of the buildings 320, 322, 324, 326, 328, 330, trees, picnic tables, streets, etc. The area 302 may also be rasterized into fragments that correspond to the pixels of a display of a client computing device. As shown, the virtual camera 410 is descending from the apex 362 (not shown) of the path of the transition 360 to position 342 in order to complete the transition.

From the position, orientation, and distance of the virtual camera 410 as depicted in FIG. 7, the lines-of-sight extend and intersect the street-level image 350 at various angles. For example, line-of-sight 720 intersects the street-level image 350 at a generally non-perpendicular, almost tangential, angle relative to a surface of street-level image 350. Further, a large distance separates the virtual camera 410 and the street-level image 350. Based on the position, orientation, distance, and the alignment of the lines-of-sight of the virtual camera 410 relative to the street-level image 350, the blending ratio may favor the colors from the fragments of the 3D model 300 of area 310. In this regard, the amount of color from a fragment of the 3D model 300 may increase as the virtual camera 410 becomes less coincident with the street-level image 350.

Figure 8:
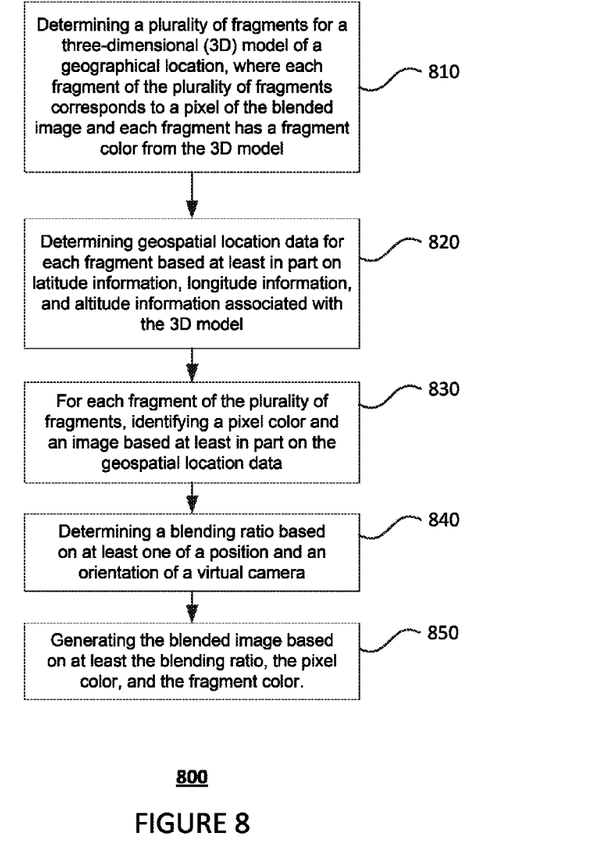
FIG. 8 is an example flow diagram in accordance with aspects of the disclosure.

FIG. 8 is an example flow diagram 800 for generating a blended image. By way of the example depicted in FIG. 1 only, at block 810, one or more computing devices, e.g., client computing device 110, may determine a plurality of fragments for a 3D model of a geographical location stored in memory, e.g., memory 114, memory 144, storage system 150. Each fragment of the plurality of fragments may correspond to a pixel of the blended image and each fragment may have a fragment color. At block 820, the one or more computing devices 110 may determine geospatial location data for each fragment based at least in part on latitude information, longitude information, and altitude information associated with the 3D model. Using the geospatial location data, pixel color corresponding to each fragment may be identified.

Thus, at block 830, for each fragment of the plurality of fragments, the one or more computing devices 110 may identify a pixel color and an image based at least in part on the geospatial location data at block 830. The identified pixel color corresponding to each fragment may be mixed with the respective fragment color based on a blending ratio. Further, as noted above, the image may be a street-level image stored in memory that is associated with the 3D model. At block 840, the one or more computing devices 110 may determine the blending ratio. As noted above, the blending ratio may be a ratio of a quantity of the pixel color and a quantity of the fragment color. The blending ratio may depend on the position, orientation, distance, etc. of a virtual camera relative to a street-level image within the 3D model.

At block 850, the one or more computing devices 110 may generate the blended image based on at least the blending ratio, the pixel color, and the fragment color. The blended image may be provided for display on a separate display device, or on the one or more client computing devices 110, or other client computing devices such as client computing device 130 and client computing device 160 of network 170. Further, when a request to transition from the image at block 830 to another image is received, the one or more computing devices 110 may generate a series of blended images along a particular path of the transition between the two images. The blended images may be part of an animation and may also be stored in memory.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for generating a blended image comprising:
   determining, by one or more computing devices, a plurality of fragments for a three-dimensional (3D) model of a geographical location, wherein each fragment of the plurality of fragments corresponds to a pixel of the blended image and each fragment has a fragment color from the 3D model;
   determining, by the one or more computing devices, geospatial location data for each fragment based on latitude information, longitude information, and altitude information associated with the 3D model;
   for each fragment of the plurality of fragments, identifying, by the one or more computing devices, a pixel color and an image based at least in part on the geospatial location data;
   determining, by the one or more computing devices, a blending ratio based on at least one of a position and an orientation of a virtual camera, wherein the blending ratio is a ratio of a quantity of a pixel color to a quantity of a fragment color; and
   generating, by the one or more computing devices, the blended image based on at least the blending ratio, the pixel color, and the fragment color.

2. The method of claim 1, further comprising providing for display, by the one or more computing devices, the blended image.

3. The method of claim 1, wherein the blending ratio is based on at least one of the position and the orientation of the virtual camera relative to the image.

4. The method of claim 1, wherein the pixel of the blended image corresponds to a pixel of a display.

5. The method of claim 1, wherein the quantity of the pixel color increases as at least one of the position and the orientation of the virtual camera aligns with the image.

6. The method of claim 1, wherein the quantity of the fragment color increases as the virtual camera moves away from the image or as at least one of the position and the orientation of the virtual camera misaligns with the image.

7. The method of claim 1, further comprising receiving, by the one or more computing devices, a request to transition from the image to another image.

8. The method of claim 7, further comprising providing for display, by the one or more computing devices, a series of blended images corresponding to a path of the transition from the image to another image.

9. A system comprising:
   a memory;
   one or more computing devices, each of the one or more computing devices having one or more processors, the one or more computing devices being coupled to the memory;
   wherein the one or more computing devices are configured to:
      determine a plurality of fragments for a three-dimensional (3D) model of a geographical location, wherein each fragment of the plurality of fragments corresponds to a pixel of a blended image and each fragment has a fragment color from the 3D model;
      determine geospatial location data for each fragment based on latitude information, longitude information, and altitude information associated with the 3D model;
      for each fragment of the plurality of fragments, identify a pixel color and an image based at least in part on the geospatial location data;
      determine a blending ratio is based on at least one of a position and an orientation of a virtual camera, wherein the blending ratio is a ratio of a quantity of a pixel color to a quantity of a fragment color; and
      generate the blended image based on at least the blending ratio, the pixel color, and the fragment color.

10. The system of claim 9, wherein the one or more computing devices are further configured to provide for display the blended image.

11. The system of claim 9, wherein the blending ratio is based on at least one of the position and the orientation of the virtual camera relative to the image.

12. The system of claim 9, wherein the pixel of the blended image corresponds to a pixel of a display.

13. The system of claim 9, wherein the quantity of the pixel color increases as at least one of the position and the orientation of the virtual camera aligns with the image.

14. The system of claim 9, wherein the quantity of the fragment color increases as the virtual camera moves away from the image or as at least one of the position and the orientation of the virtual camera misaligns with the image.

15. The system of claim 9, wherein the one or more computing devices are further configured to receive a request to transition from the image to another image.

16. The system of claim 15, wherein the one or more computing devices are further configured to provide for display a series of blended images corresponding to a path of the transition from the image to another image.

17. A non-transitory, tangible computer-readable medium on which instructions are stored, the instructions, when executed by one or more computing devices perform a method for generating a blended image, the method comprising:
   determining a plurality of fragments for a three-dimensional (3D) model of a geographical location, wherein each fragment of the plurality of fragments corresponds to a pixel of the blended image and each fragment has a fragment color from the 3D model;
   determining geospatial location data for each fragment based on latitude information, longitude information, and altitude information associated with the 3D model;
   for each fragment of the plurality of fragments, identifying a pixel color and an image based at least in part on the geospatial location data;
   determining a blending ratio based on at least one of a position and an orientation of a virtual camera, wherein the blending ratio is a ratio of a quantity of a pixel color to a quantity of a fragment color; and generating the blended image based on at least the blending ratio, the pixel color, and the fragment color.

18. The non-transitory, tangible computer-readable medium of claim 17, the method further comprising providing for display the blended image.

\* \* \* \* \*